United States Patent
Jyouzaki et al.

(10) Patent No.: US 10,465,592 B2
(45) Date of Patent: Nov. 5, 2019

(54) STRADDLE-TYPE VEHICLE

(71) Applicant: KAWASAKI JUKOGYO KABUSHIKI KAISHA, Kobe-shi, Hyogo (JP)

(72) Inventors: Takahiro Jyouzaki, Akashi (JP); Akira Soeda, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 232 days.

(21) Appl. No.: 15/621,546

(22) Filed: Jun. 13, 2017

(65) Prior Publication Data

US 2018/0030878 A1 Feb. 1, 2018

(30) Foreign Application Priority Data

Jul. 28, 2016 (JP) .................. 2016-148011

(51) Int. Cl.
| | |
|---|---|
| *F01P 1/02* | (2006.01) |
| *F01P 11/10* | (2006.01) |
| *F02B 77/11* | (2006.01) |
| *B60K 11/06* | (2006.01) |
| *B60K 11/08* | (2006.01) |
| *B62J 17/08* | (2006.01) |

(Continued)

(52) U.S. Cl.
CPC ............... *F01P 1/02* (2013.01); *B60K 11/06* (2013.01); *B60K 11/08* (2013.01); *F01P 11/10* (2013.01); *F02B 77/11* (2013.01); *B60Y 2200/12* (2013.01); *B62J 2017/086* (2013.01); *B62K 11/04* (2013.01); *B62M 7/04* (2013.01); *B62M 7/06* (2013.01); *F01N 2340/04* (2013.01); *F01P 2050/16* (2013.01); *F02B 61/02* (2013.01)

(58) Field of Classification Search
CPC .......... F01P 1/02; F01P 11/10; F01P 2050/16; F02B 61/02; F02B 77/11; B60K 11/06; B60K 11/08; B62M 7/06
See application file for complete search history.

(56) References Cited

U.S. PATENT DOCUMENTS

| | | | |
|---|---|---|---|
| 6,269,896 B1 * | 8/2001 | Tanaka ................... | B60K 11/04 180/229 |
| 2004/0211610 A1 * | 10/2004 | Ito ........................... | B62J 17/00 180/228 |

(Continued)

FOREIGN PATENT DOCUMENTS

JP            H1045084 A       2/1998

*Primary Examiner* — Joseph M Rocca
*Assistant Examiner* — Maurice L Williams
(74) *Attorney, Agent, or Firm* — Alleman Hall Creasman & Tuttle LLP

(57) ABSTRACT

A straddle-type vehicle comprises a radiator through which air flowing from a front flows in a forward and rearward direction of a vehicle body; an engine which generates driving power for allowing the straddle-type vehicle to travel, the engine being disposed rearward of the radiator; and a cover unit covering from above a space formed between the radiator and the engine, and the engine, wherein the cover unit includes: a hard cover which is located at a front side of the cover unit, extends rearward from the radiator, and covers the space formed between the radiator and the engine; and a soft cover which is located at a rear side of the cover unit, extends rearward from the hard cover, and covers the engine.

13 Claims, 6 Drawing Sheets

(51) Int. Cl.
*B62M 7/06* (2006.01)
*F02B 61/02* (2006.01)
*B62M 7/04* (2006.01)
*B62K 11/04* (2006.01)

(56) References Cited

U.S. PATENT DOCUMENTS

| | | | | |
|---|---|---|---|---|
| 2006/0042569 A1* | 3/2006 | Jacquay | .................... | F01P 5/06 |
| | | | | 123/41.49 |
| 2006/0254844 A1* | 11/2006 | Nakashima | .............. | B62J 17/00 |
| | | | | 180/229 |
| 2008/0012391 A1* | 1/2008 | Nakata | ..................... | B62J 17/02 |
| | | | | 296/208 |
| 2008/0289896 A1* | 11/2008 | Kosuge | .................. | B60K 11/06 |
| | | | | 180/312 |
| 2009/0199792 A1* | 8/2009 | Kondou | ................. | B60K 11/02 |
| | | | | 123/41.49 |
| 2012/0292122 A1* | 11/2012 | Verbrugge | ............. | B62D 25/12 |
| | | | | 180/68.4 |
| 2016/0009329 A1* | 1/2016 | Tsubone | .................. | B62J 37/00 |
| | | | | 180/229 |

* cited by examiner

STRADDLE-TYPE VEHICLE

CROSS-REFERENCE TO THE RELATED APPLICATION

This application claims priority to and the benefit of Japanese Patent Application No. 2016-148011 filed on Jul. 28, 2016, the entire disclosure of which is incorporated herein by reference.

BACKGROUND OF THE INVENTION

Field of the Invention

The present invention relates to a straddle-type vehicle such as a motorcycle.

Description of the Related Art

A straddle-type vehicle such as a motorcycle includes, for example, a heat shield cover disclosed in Japanese Laid-Open Patent Application Publication No. Hei. 10-45084. The heat shield cover is disposed to cover a space formed between a radiator and an engine, and the engine. The heat shield cover prevents a situation in which heated air generated by flowing the air (the air flowing from the front) through the radiator (hereinafter this will be simply referred to as heated air) moves up and contacts the body of a rider straddling a seat of the straddle-type vehicle and components of the straddle-type vehicle. The heat shield cover is made of, for example, a sheet-like member.

In a case where the heat shield cover is made of a sheet-like rubber, it is difficult to dispose the heat shield cover formed in a three-dimensional shape. This may decrease design flexibility of the straddle-type vehicle. In contrast, in a case where the whole of the heat shield cover is made of a hard material such as a resin, it may be difficult to carry out an assembling operation in, for example, manufacturing of the straddle-type vehicle.

SUMMARY OF THE INVENTION

An object of the present invention is to realize an easier assembling operation and a more flexible design of the straddle-type vehicle.

According to an aspect of the present invention, a straddle-type vehicle comprises: a radiator through which air flowing from a front flows in a forward and rearward direction of a vehicle body; an engine which generates driving power for allowing the straddle-type vehicle to travel, the engine being disposed rearward of the radiator; and a cover unit covering from above a space formed between the radiator and the engine, and the engine, wherein the cover unit includes: a hard cover which is located at a front side of the cover unit, extends rearward from the radiator, and covers the space formed between the radiator and the engine; and a soft cover which is located at a rear side of the cover unit, extends rearward from the hard cover, and covers the engine.

In accordance with the above-described configuration, the hard cover extending rearward from the radiator, and covering the space formed between the radiator and the engine is located at the front side of the cover unit. The hard cover formed in a three-dimensional shape serves to properly guide a flow of heated air in a specified direction, heated air shield effects provided by the cover unit are not reduced, and the straddle-type vehicle can be designed more flexibly.

Since the soft cover extending rearward from the hard cover and covering the engine is located at the rear side of the cover unit, the soft cover of the cover unit can be efficiently disposed in a space inside the vehicle body, and thus, the cover unit can be efficiently disposed. As a result, the straddle-type vehicle can be more easily assembled.

The straddle-type vehicle may further comprise: a fan which is disposed in such a manner that an axial direction of a rotary shaft of the fan conforms to the forward and rearward direction, and forcibly flows the air through the radiator, and the hard cover may include a side wall extending in a vertical direction, on at least a first side in a vehicle width direction of the vehicle body.

In accordance with this configuration, since the side wall of the hard cover extending in the vertical direction, on at least the first side in the vehicle width direction can increase the strength of the hard cover and make it difficult for the hard cover to be deformed, the heated air shield effects provided by the cover unit can be stabilized. In addition, since the heated air can be guided in the downward direction along the wall surface of the side wall, upward movement of the heated air can be effectively prevented.

The first side in the vehicle width direction may be a side where the fan is rotatable in a downward direction in a front view, of both sides in the vehicle width direction, and a lower end portion of at least a portion of the side wall of the hard cover may be located above the rotary shaft of the fan.

In accordance with this configuration, since the side wall of the hard cover is provided on the side where the fan is rotatable in the downward direction in the front view, of the both sides in the vehicle width direction, the heated air can be efficiently guided in the downward direction by the side wall of the hard cover, and the upward movement of the heated air can be effectively prevented. In addition, since the lower end portion of at least a portion of the side wall of the hard cover is located above the rotary shaft of the fan, the heated air can be forcefully discharged from the lower end portion of the side wall to an outward region in the vehicle width direction, along a tangential direction of the fan in the front view. In this way, the heated air can be quickly moved away from the vehicle body of the straddle-type vehicle while preventing the heated air from contacting the body of the rider straddling the straddle-type vehicle and components of the straddle-type vehicle.

The hard cover further may include a body extending rearward from the radiator, and a rear wall extending in the vehicle width direction and in the vertical direction, from the body, and a lower end portion of the rear wall of the hard cover may be located above a center of the radiator in the vertical direction.

In accordance with this configuration, the air which has flowed through the fan can be guided in the rearward direction by the body of the hard cover extending rearward from the radiator, and guided in the downward direction by the rear wall of the hard cover extending in the vertical direction from the body of the hard cover. In this way, the upward movement of the heated air from the space formed between the radiator and the engine can be effectively prevented. Since the lower end portion of the rear wall of the hard cover is located above the center of the radiator in the vertical direction, a large amount of air can be flowed through the inside of the radiator at a location that is below the lower end portion of the rear wall and exchanges heat with the coolant flowing through the inside of the radiator. In this way, efficient heat exchange between the air and the coolant occurs.

The hard cover may further include a guide side wall which is located on a second side in the vehicle width direction, is curved along a circumferential direction of the fan, and guides the air along the circumferential direction of the fan, in a front view.

In accordance with this configuration, since the air which has flowed through the fan can be efficiently guided by the guide side wall of the hard cover, along the circumferential direction of the fan, the upward movement of the heated air from the fan can be prevented by the cover unit, and hence the heated air shield effects provided by the cover unit can be improved.

The radiator may include an inlet which is disposed on a third side in a direction perpendicular to the forward and rearward direction and through which a coolant which has cooled the engine flows into the radiator, and in a front view, a center of the hard cover in the direction perpendicular to the forward and rearward direction may be located on a fourth side in the direction perpendicular to the forward and rearward direction, relative to a center of the radiator in the direction perpendicular to the forward and rearward direction.

In accordance with this configuration, since the center of the hard cover in the direction perpendicular to the forward and rearward direction is located on the fourth side in the direction perpendicular to the forward and rearward direction, relative to the center of the radiator in the direction perpendicular to the forward and rearward direction, in the front view, the air can be easily flowed through the inside of the radiator on the third side in the direction perpendicular to the forward and rearward direction. Thus, the coolant in a high-temperature state which has flowed through the engine and has just entered the radiator through the inlet can efficiently exchange heat with the air flowing through the inside of the radiator and can be effectively cooled.

The straddle-type vehicle may further comprise: a retaining member which is provided at the hard cover and secures harness disposed inside the vehicle body to the hard cover. In accordance with this configuration, since the hard cover is provided with the retaining member used to secure the harness to the hard cover, the harness can be easily positioned in the space inside the vehicle body, and the hard cover also functions as a support member for supporting the retaining member. Therefore, the support member which is separate from the cover unit may be omitted.

The straddle-type vehicle may further comprise: a regulator which controls a voltage value of electric power output from a power generator which generates electric power by the driving power generated by the engine, and when viewed from above, the regulator may be disposed at a location that overlaps with the hard cover.

In accordance with this configuration, since the regulator which is a heat generation component generating heat during a control for the voltage value is disposed at a location that overlaps with the hard cover, when viewed from above, the hard cover can prevent the heated air moving upward from the space formed between the radiator and the engine from contacting the regulator. As a result, the regulator can be stably operated.

The soft cover may cover a head cover of the engine, and may be engaged with a portion of the engine which is rearward of the head cover. In accordance with this configuration, the soft cover can prevent the heated air generated by heating the air by the head cover from moving in the upward direction, and upward displacement of the soft cover from the head cover due to the air can be prevented.

At least one of an electric component of the engine and an engine component included in the engine may be provided at the engine and protrudes upward from the engine, and at least one air-intake system member may be connected to the engine, the soft cover may include an opening into which at least one of the electric component and the engine component is inserted, and is connected to a rear portion or an upper portion of the hard cover, and a rear portion of the soft cover may be retained by a connection section of the engine which is connected to the at least one air-intake system member.

In accordance with this configuration, since at least one of the electric component of the engine and the engine component, which protrudes upward from the engine, is inserted into the opening of the soft cover, and the soft cover is connected to the rear portion or upper portion of the hard cover, the soft cover can be retained by the hard cover and the engine can be easily covered by the soft cover. Further, the electric component of the engine or the engine component can be easily operated through the opening of the soft cover in a state in which the soft cover is mounted on the vehicle body of the straddle-type vehicle. In this way, the operator can easily perform maintenance. Further, since the rear portion of the soft cover is retained by the connection section of the engine which is connected to the air-intake system member, the soft cover fully covers from above a cylinder and a cylinder head which are main heat generation sources of the engine. Therefore, it becomes possible to effectively prevent the heated air from contacting the body of the rider straddling the straddle-type vehicle.

When viewed from above, a dimension in a vehicle width direction of the soft cover may be set smaller than a dimension in the vehicle width direction of a cylinder head of the engine. In accordance with this configuration, since the dimension in the vehicle width direction of the soft cover is smaller than the dimension in the vehicle width direction of a cylinder head of the engine, when viewed from above, the soft cover is not easily seen from the outside region of the straddle-type vehicle in the side view. Therefore, the external appearance of the straddle-type vehicle can be maintained.

The soft cover may be disposed inward relative to both sides of the radiator in a vehicle width direction, and when viewed from above, a dimension in the vehicle width direction of the soft cover may be set smaller than a dimension in the vehicle width direction of a cylinder head of the engine. In accordance with this configuration, the soft cover is not easily seen from the outside region of the straddle-type vehicle.

The hard cover may include a plurality of engagement portions which are arranged side by side in a vehicle width direction and have tip end portions extending downward, and each of the plurality of engagement portions may extend forward and may be engaged with an upper end portion of the radiator. In accordance with this configuration, the hard cover can be connected to the upper end portion of the radiator with a high assembling efficiency by use of the plurality of engagement portions.

In accordance with this configuration, it becomes possible to realize an easier assembling operation and a more flexible design of the straddle-type vehicle.

The above and further objects, features and advantages of the present invention will more fully be apparent from the following detailed description of preferred embodiment with reference to the accompanying drawings.

DETAILED DESCRIPTION OF THE EMBODIMENTS

Hereinafter, the embodiment of the present invention will be described with reference to the drawings. Throughout the drawings, the same or corresponding constituents are designated by the same reference symbols, and will not be described repeatedly. The stated directions are from the perspective of a rider straddling a motorcycle 1. A vehicle width direction of the vehicle body of the motorcycle 1 corresponds with a rightward and leftward direction of the vehicle body.

Figure 1:
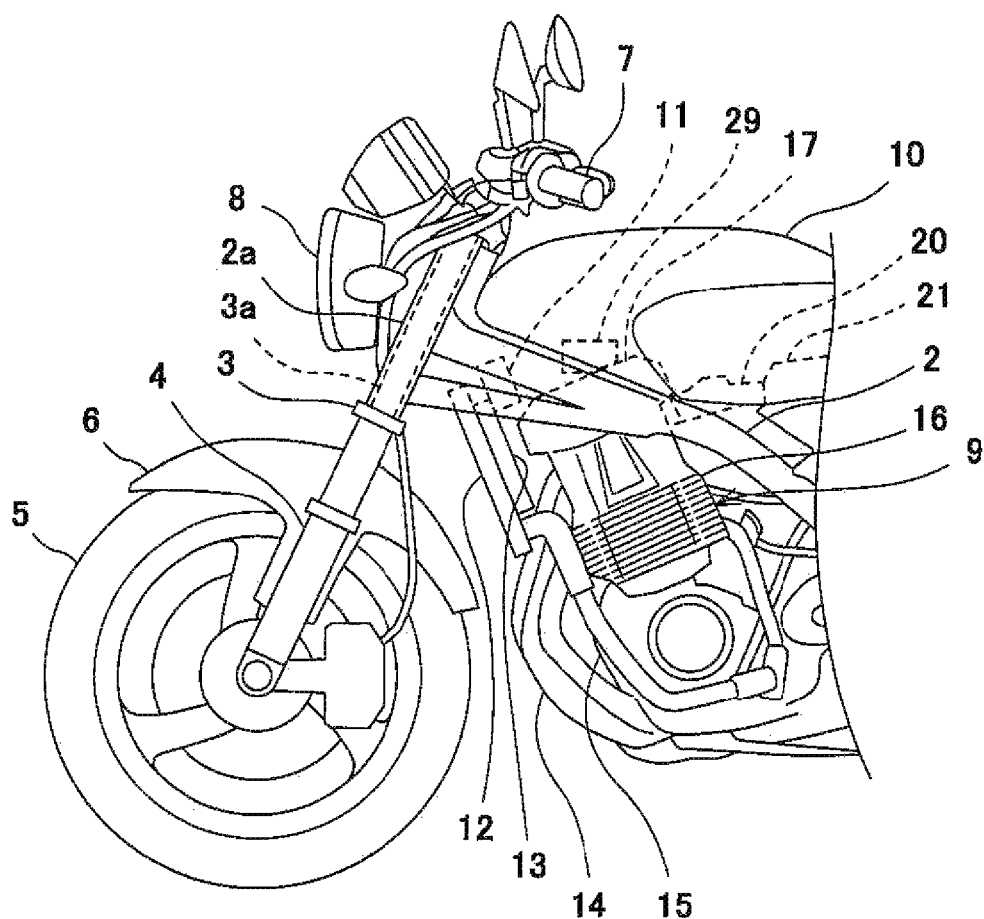
FIG. 1 is a left side view showing the front portion of a motorcycle according to an embodiment.

FIG. 1 is a left side view showing the front portion of the motorcycle 1 according to an embodiment. Referring now to FIG. 1, the motorcycle 1 is an example of a straddle-type vehicle, and includes a vehicle body frame 2, a steering member 3, a pair of front forks 4, a front wheel 5, a front fender 6, a handle 7, a head lamp 8, an engine 9 which generates driving power for allowing the motorcycle 1 to travel, a fuel tank 10, a regulator (also referred to as "regulator rectifier") 11, a radiator 12, a fan 13, and an exhaust pipe 14.

The motorcycle 1 further includes a seat which can be straddled by the rider, a rear wheel, a swing arm on which the rear wheel is rotatably mounted, a muffler connected to the downstream end portion of the exhaust pipe 14, and a rear fender, in a rear portion of the motorcycle 1 which is not shown in FIG. 1. The motorcycle 1 is a motorcycle of, for example, a naked type. The motorcycle of the naked type means a motorcycle which does not include a cowling.

The vehicle body frame 2 extends in a forward and rearward direction of a vehicle body, and the head lamp 8, the engine 9, the fuel tank 10, the regulator 11, and the radiator 12 are mounted on the vehicle body frame 2. A head pipe 2a is provided at the front portion of the vehicle body frame 2. A steering stem 3a is provided at the center of a steering member 3 in the vehicle width direction, and rotatably supported by the head pipe 2a.

The pair of front forks 4 are supported on the steering member 3. The front wheel 5 is rotatably mounted on the lower portions of the pair of front forks 4. The front fender 6 is disposed in a gap formed between the pair of front forks 4 at a location that is above the front wheel 5. The handle 7 is secured to the upper portion of the steering member 3. The head lamp 8 is mounted on the front portion of the vehicle body frame 2.

The engine 9 outputs the driving power for rotating the rear wheel. The engine 9 is located rearward of the radiator 12. The engine 9 is disposed at a location that overlaps with the fuel tank 10 in a vertical direction. The engine 9 includes a cylinder block 15, a cylinder head 16 disposed above the cylinder block 15, and a head cover 17 disposed above the cylinder head 16. A power (electric power) generator 22 which generates electric power by the driving power generated by the engine 9 is disposed on a right side of the engine 9 (see FIG. 6).

At least one air-intake system member is connected to the engine 9. Specifically, the air-intake system member is a throttle body 20. The throttle body 20 is connected to the rear portion of the cylinder head 16. An air cleaner 21 is connected to the rear portion of the throttle body 20. The air which has flowed through the air cleaner 21 and the throttle body 20 and fuel injected from an injector attached on the throttle body 20 are sent to a combustion chamber of the engine 9, from the rear of the cylinder head 16. The engine 9 generates the driving power in such a manner that an ignition (spark) plug attached on the cylinder head 16 is lighted, inside the combustion chamber.

The fuel tank 10 reserves therein the fuel to be supplied to the engine 9. The regulator 11 controls a voltage value of the electric power output from the power generator 22 and supplies the electric power with the controlled voltage value to the head lamp 8 and electric components.

The air flowing from the front passes through the radiator 12 in the forward and rearward direction. In the radiator 12, a coolant which has cooled the engine 9 flows through the inside, and exchanges heat with the air flowing through the radiator 12. After that, the coolant is supplied to the engine 9. A reservoir tank 29 is disposed rearward of the radiator 12 and mounted on the vehicle body frame 2. The reservoir tank 29 supplies the coolant to the radiator 12 to refill the radiator 12.

A fan 13 is disposed behind the radiator 12, and forcibly flows the air through the radiator 12. An exhaust gas discharged from the engine 9 is sent to the muffler through the exhaust pipe 14. The exhaust pipe 14 is connected to the front side of the engine 9, and extends rearward at a location that is below the engine 9.

Figure 2:
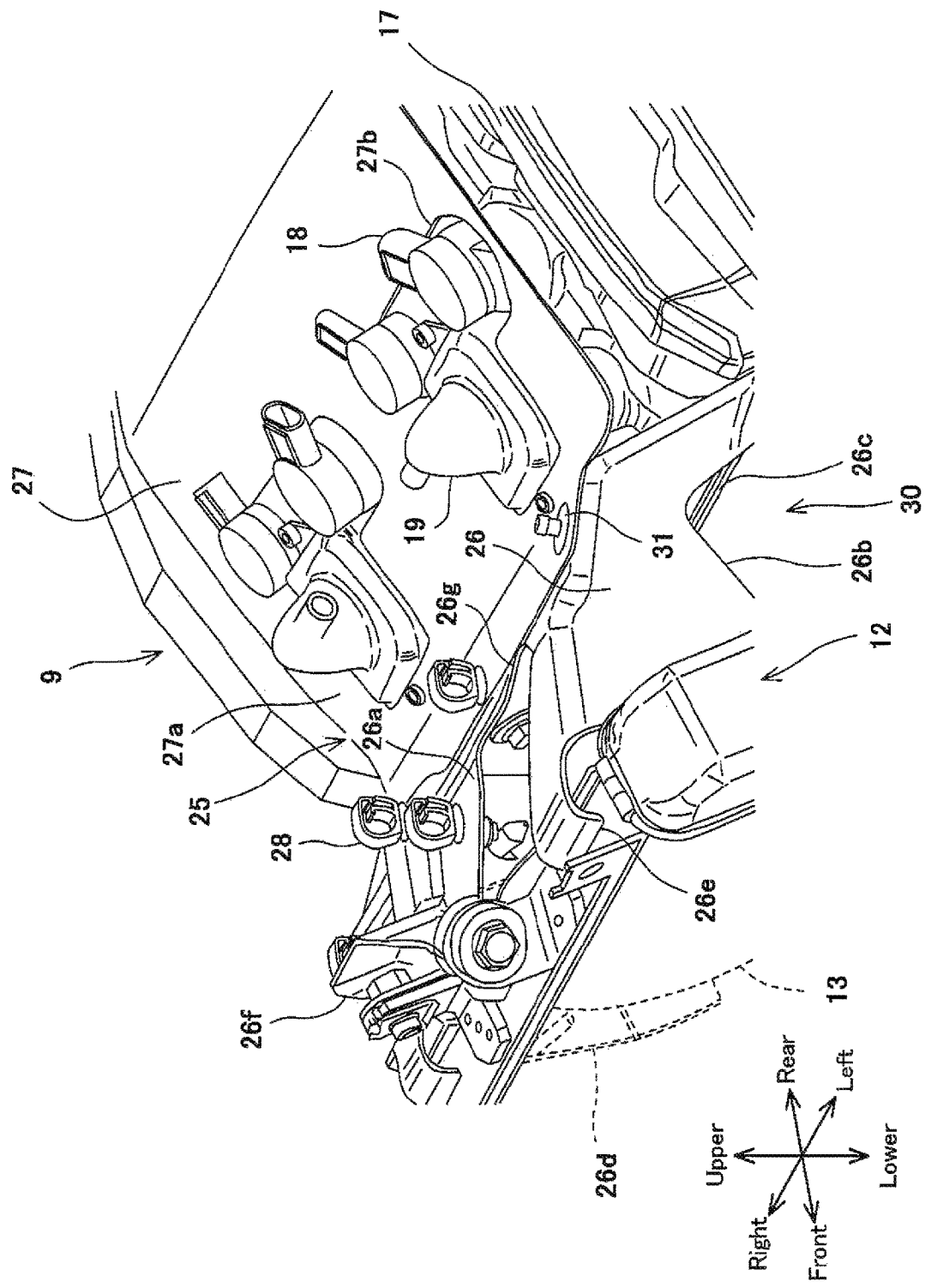
FIG. 2 is a perspective view showing an engine, a radiator, and a cover unit of the motorcycle of FIG. 1, when viewed from the left and the front.
Figure 3:
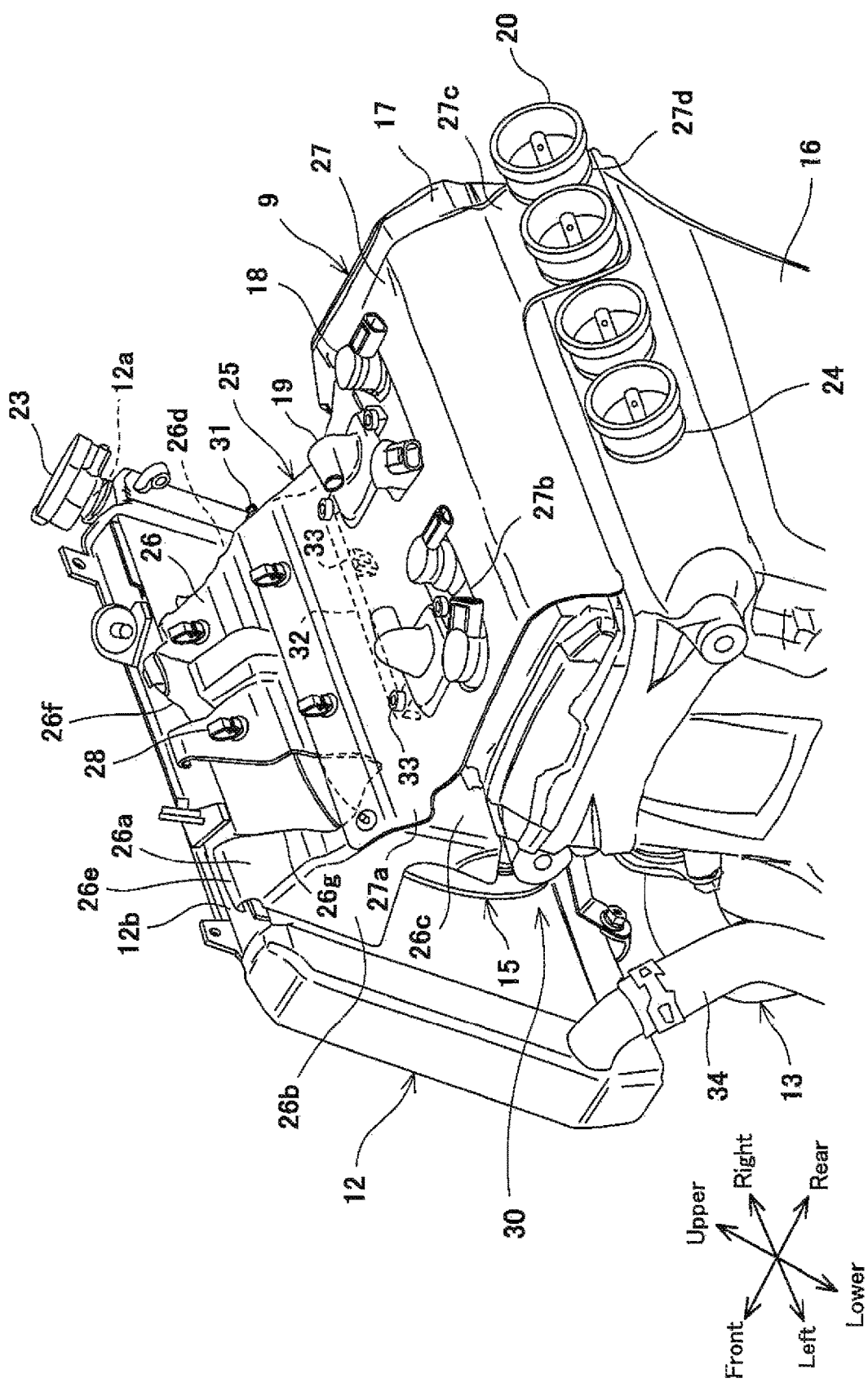
FIG. 3 is a perspective view showing the engine, the radiator, and the cover unit of FIG. 2, when viewed from the left and the rear.
Figure 4:
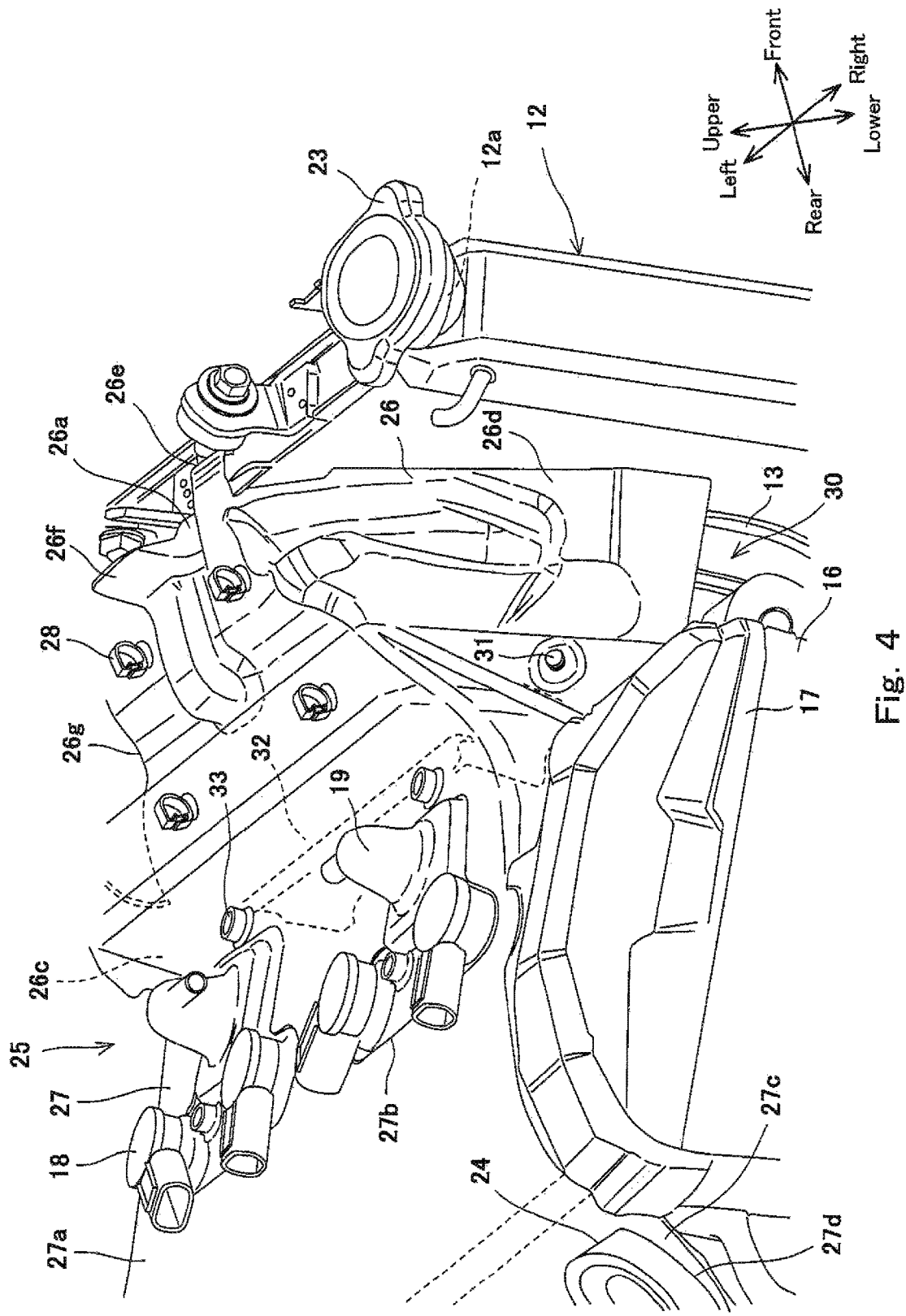
FIG. 4 is a perspective view showing the engine, the radiator, and the cover unit of FIG. 2, when viewed from the right and the rear.

FIG. 2 is a perspective view showing the engine 9, the radiator 12, and a cover unit 25 of the motorcycle 1 of FIG. 1, when viewed from the left and the front. FIG. 3 is a perspective view showing the engine 9, the radiator 12, and the cover unit 25 of FIG. 2, when viewed from the left and the rear. FIG. 4 is a perspective view showing the engine 9, the radiator 12, and the cover unit 25 of FIG. 2, when viewed from the right and the rear.

As shown in FIGS. 2 to 4, at least one of (both of in the present embodiment) an electric component 18 of the engine 9 and an engine component 19 included in the engine 9 is provided on the upper portion of the head cover 17 and protrudes upward from the engine 9. The electric component 18 is, for example, a plug coil which charges and discharges the ignition plug attached on the engine 9. The engine component 19 is, example, a reed valve mechanism which introduces secondary air into the inside of the engine 9.

In the motorcycle 1 of the present embodiment, four electric components 18 are arranged side by side in the vehicle width direction, and two engine components 19 are arranged side by side in the vehicle width direction. The number of the electric components 18 and the number of engine components 19 are not limited.

A plurality of ducts 24 are provided on the rear side of the cylinder head 16. The ducts 24 are connection sections of the engine 9 which are connected to the throttle body 20. In the present embodiment, four ducts 24 are arranged side by side in the vehicle width direction.

The radiator 12 is disposed in front of the engine 9 with a space 30 between the engine 9 and the radiator 12. The radiator 12 includes an inlet 12a through which the coolant which has cooled the engine 9 flows into the radiator 12, and a radiator cap 23 covering the inlet 12a. Hereinafter, one of both sides in the vehicle width direction will be referred to a first side (left side in the present embodiment), and the other of the both sides in the vehicle width direction will be referred to as a second side (right side in the present embodiment). Also, one of both sides in a direction perpendicular to the forward and rearward direction will be referred to as a third side (right side in the vehicle width direction in the present embodiment), and the other of the both sides in the direction perpendicular to the forward and rearward direction will be referred to as a fourth side (left side in the vehicle width direction in the present embodiment). The inlet 12a is disposed on the third side (right side in the present embodiment) of the radiator 12 in the direction perpendicular to the forward and rearward direction. The inlet 12a is in communication with the interior of the radiator 12. The coolant supplied from the reservoir tank 29 is sent to the inside of the radiator 12 through the inlet 12a and refills the radiator 12. The coolant exchanges heat with the air flowing through the radiator 12 and then is sent to the engine 9 through a pipe 34 connected to the fourth side (left side in the present embodiment) of the radiator 12 in the direction perpendicular to the forward and rearward direction. Then, the coolant cools the engine 9, and then is returned to the radiator 12 through a pipe which is not shown.

The motorcycle 1 further includes the cover unit 25. The cover unit 25 covers from above the space 30 formed between the radiator 12 and the engine 9, and the engine 9. The cover unit 25 serves to prevent the heated air flowing upward from the space 30 and the engine 9 from contacting the body of the rider straddling the motorcycle 1 and the components of the motorcycle 1. The cover unit 25 includes a hard cover 26 made of a hard material and a soft cover 27 made of a soft material.

For example, the hard cover 26 is a resin product (product made of a resin), and has a three-dimensional shape. The hard cover 26 serves to guide the heated air in a predetermined direction (in a rearward direction in the present embodiment). The hard cover 26 is located at a front side of the cover unit 25, extends rearward from the radiator 12, and covers the space 30. The hard cover 26 is not limited to the resin product, and may be, for example, a metal product (product made of metal).

The hard cover 26 includes a body 26a, a side wall 26b, a rear wall 26c, and a guide side wall 26d. The body 26a has a plate shape extending in the vehicle width direction and in the forward and rearward direction. The body 26a extends rearward from the radiator 12, and is tilted in a downward direction, from the front to the rear. A plurality of engagement portions 26e are provided at the front side of the body 26a. The plurality of engagement portions 26e are arranged side by side in the vehicle width direction. The plurality of engagement portions 26e extend forward. The tip end portions (front end portions) of the plurality of engagement portions 26e extend downward and are engaged with the upper end portion of the radiator 12.

The body 26a is provided with a protruding portion 26f protruding upward from the upper end portion of the radiator 12, at a center in the vehicle width direction, of the front side of the body 26a. A wire 35 (see FIG. 6) extending from the fan 13 is inserted into a gap formed between the protruding portion 26f and the radiator 12.

The motorcycle 1 includes a plurality retaining members 28. More specifically, the plurality retaining members 28 are provided on the upper surface of the body 26a in such a manner that the retaining members 28 are spaced apart from each other. In the present embodiment, for example, the plurality retaining members 28 are ring members made of a resin, respectively. The plurality retaining members 28 are mounted on the body 26a in a state in which the lower portions of the retaining members 28 penetrate the body 26a in the downward direction. The plurality retaining members 28 are used to secure the wire 35, harness 36 (see FIG. 6), and a tube connecting the radiator 12 to the reservoir tank 29, which are disposed inside the vehicle body, to the hard cover 26.

Although four retaining members 28 are provided in the present embodiment, the number of the retaining members 28 is not limited to this. At least one of the retaining members 28 may be used to secure a coupler of a wire disposed inside the vehicle body, to the hard cover 26, or may be used to secure an electric component body such as the regulator 11 or a relay box, to the hard cover 26.

In the left portion of the body 26a in the vehicle width direction, a hollow space 26g is provided to avoid interference between the body 26a and the vehicle body frame 2. In a case where the body 26a of the hard cover 26 does not interfere with the vehicle body frame 2, the hollow space 26g may be omitted.

The side wall 26b of the hard cover 26 extends in a vertical direction on at least one of the first and second sides of the hard cover 26 in the vehicle width direction (the side where the fan 13 is rotatable in the downward direction, and the left side in the present embodiment), and serves to guide the air in the vertical direction. The upper portion of the side wall 26b is continuous with the left side of the body 26a.

The rear wall 26c of the hard cover 26 extends in the vehicle width direction and in the vertical direction, from the body 26a. The front portion of the rear wall 26c is gradually curved within a vertical plane perpendicular to the vehicle width direction and connected to the rear portion of the body 26a. A plate-shaped bracket 32 is provided on the upper portion of the front side of the head cover 17 and extends in the vehicle width direction. The rear wall 26c of the hard cover 26 is fastened to the bracket 32 by fastening members 33 and grommets. In this way, the hard cover 26 is mounted on the head cover 17.

The guide side wall 26d extends in the vertical direction, on the second side (right side in the present embodiment) of the hard cover 26 in the vehicle width direction. The guide side wall 26d serves to guide the air which has flowed through the radiator 12, along the circumferential direction of the fan 13. The upper portion of the guide side wall 26d is connected to the right side of the body 26a.

The soft cover 27 is, for example, a rubber product (product made of a rubber) which is sheet-like member. The soft cover 27 serves to block the heated air moving upward from the space 30 and the engine 9. The soft cover 27 is disposed at a rear side of the cover unit 25. The soft cover 27 extends rearward from the hard cover 26, and covers the engine 9. The soft cover 27 covers the head cover 17 and is engaged with a portion of the engine 9 which is rearward of the head cover 17.

The soft cover 27 includes a body 27a, a plurality of front openings 27b, an extended portion 27c, and a plurality of rear openings 27d. The body 27a extends in the forward and rearward direction and in the vehicle width direction from the rear portion of the hard cover 26. The front portion of the body 27a is connected to the hard cover 26 by a plurality of attachment members 31, and fastened to the bracket 32 by the plurality of fastening member 33. In this way, the soft cover 27 is mounted on the head cover 17.

The plurality of front openings 27b are provided in an intermediate portion of the body 27a in the forward and rearward direction. At least one of (both of in the present embodiment) the electric component 18 and the engine component 19 is inserted into each of the front openings 27b. Each of the plurality of front openings 27b is provided in the body 27a at a location corresponding to the electric component 18 and the engine component 19 in the vertical direction. In the present embodiment, for example, two electric components 18 which are adjacent to each other in the vehicle width direction and one engine component 19 are inserted into one of the front openings 27b. Alternatively, for example, the front openings 27b may be provided so that the electric component 18 and the engine component 19 are inserted into the front openings 27b, respectively.

The extended portion 27c extends rearward from the rear portion of the soft cover 27. The plurality of rear openings 27d are provided in the intermediate portion of the extended portion 27c in the forward and rearward direction. At least one of the plurality of ducts 24 is inserted into the rear opening 27d. Each of the plurality of rear openings 27d is provided in the extended portion 27c at a location corresponding to the duct 24 in the vertical direction. In the present embodiment, the extended portion 27c is provided with two rear openings 27d. Two ducts 24 which are adjacent to each other in the vehicle width direction are inserted into the two rear openings 27d, respectively. Alternatively, for example, the plurality of ducts 24 may be inserted into each of the rear openings 27d.

The ducts 24 are inserted into the rear openings 27d, respectively, and the rear portion of the soft cover 27 is retained by the ducts 24. In this way, the soft cover 27 is disposed on the head cover 17 in such a manner that the soft cover 27 extends in the forward and rearward direction along the upper surface of the head cover 17. The soft cover 27 conforms in shape to the concave and convex portions of the surface of the head cover 17.

Figure 5:
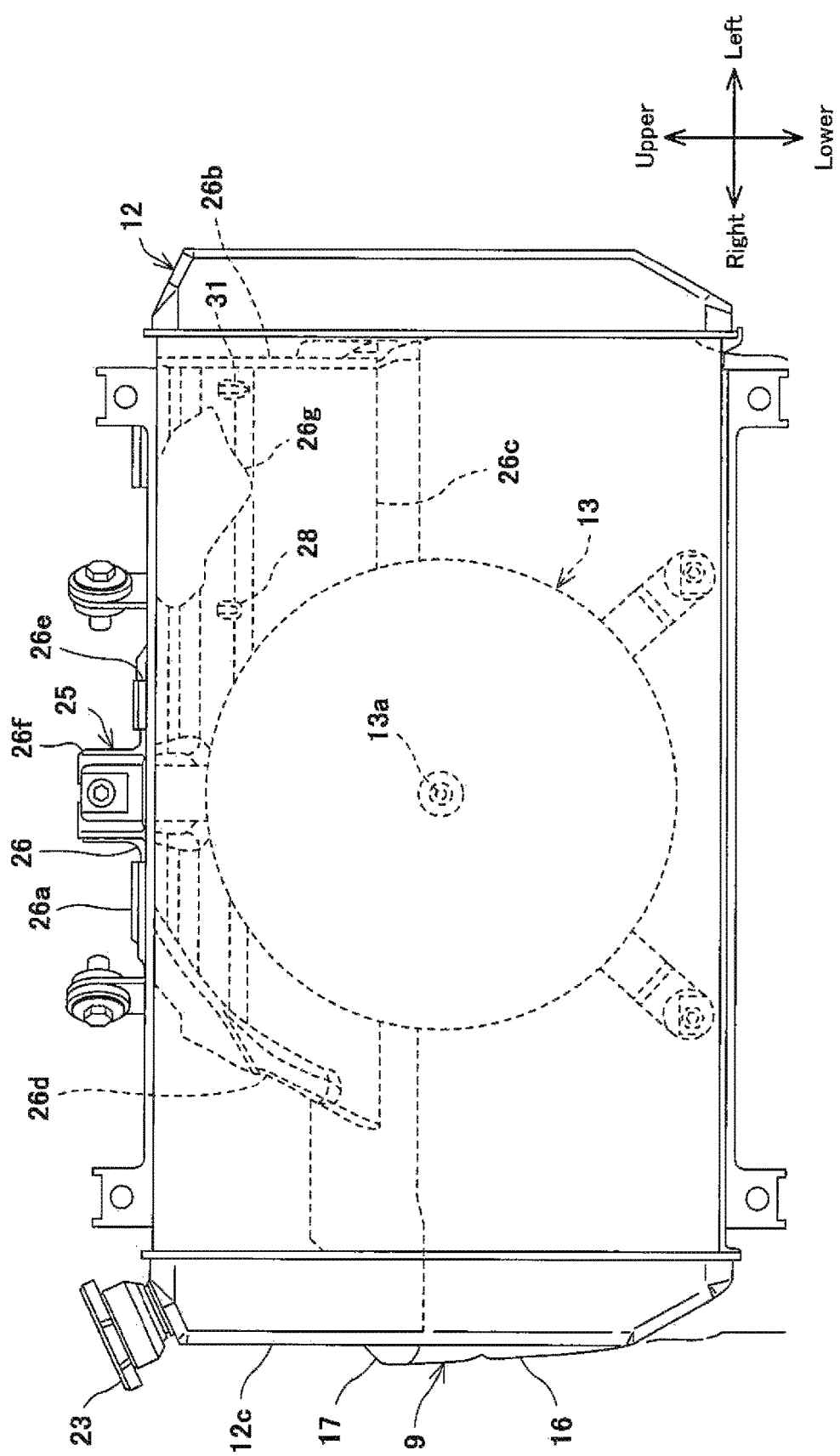
FIG. 5 is a front view showing the engine, the radiator, and the cover unit of FIG. 2.

FIG. 5 is a front view showing the engine 9, the radiator 12, and the cover unit 25 of FIG. 2. As shown in FIG. 5, when viewed from the front (in a front view), the radiator 12 extends in the vertical direction and in the vehicle width direction. The radiator 12 has a substantially parallelepiped shape in which a dimension in the forward and rearward direction is smaller than a dimension in the vehicle width direction. The fan 13 is disposed behind the radiator 12 in such a manner that the axial direction of a rotary shaft 13a conforms to the forward and rearward direction. In the motorcycle 1, when viewed from the front, the fan 13 is rotatable in a clockwise direction (rotatable to the right).

When viewed from the front, the center of the hard cover 26 in the direction perpendicular to the forward and rearward direction is located on the fourth side (left side in the vehicle width direction in the present embodiment) in the direction perpendicular to the forward and rearward direction, relative to the center of the radiator 12 in the direction perpendicular to the forward and rearward direction. The lower end portion of at least a portion (e.g., rear portion of the side wall 26b) of the side wall 26b is located above the rotary shaft 13a of the fan 13. The lower end portion of the rear wall 26c of the hard cover 26 is located above the center of the radiator 12 in the vertical direction.

When viewed from the front, the guide side wall 26d is disposed on the second side in the vehicle width direction, (right side in the vehicle width direction in the present embodiment) and is curved along the circumferential direction of the fan 13. With this configuration, the guide side wall 26d serves to guide the air along the circumferential direction of the fan 13. In the motorcycle 1 of the present embodiment, the guide side wall 26d guides the air along the circumferential direction of the fan 13, in the clockwise direction in which the fan 13 is rotatable.

Alternatively, the motorcycle 1 may include a plurality of fans. The fan 13 may be one of the plurality of fans. In this case, the fans other than the fan 13 may be rotatable in the same direction as that of the fan 13, or in a direction different from that of the fan 13.

Figure 6:
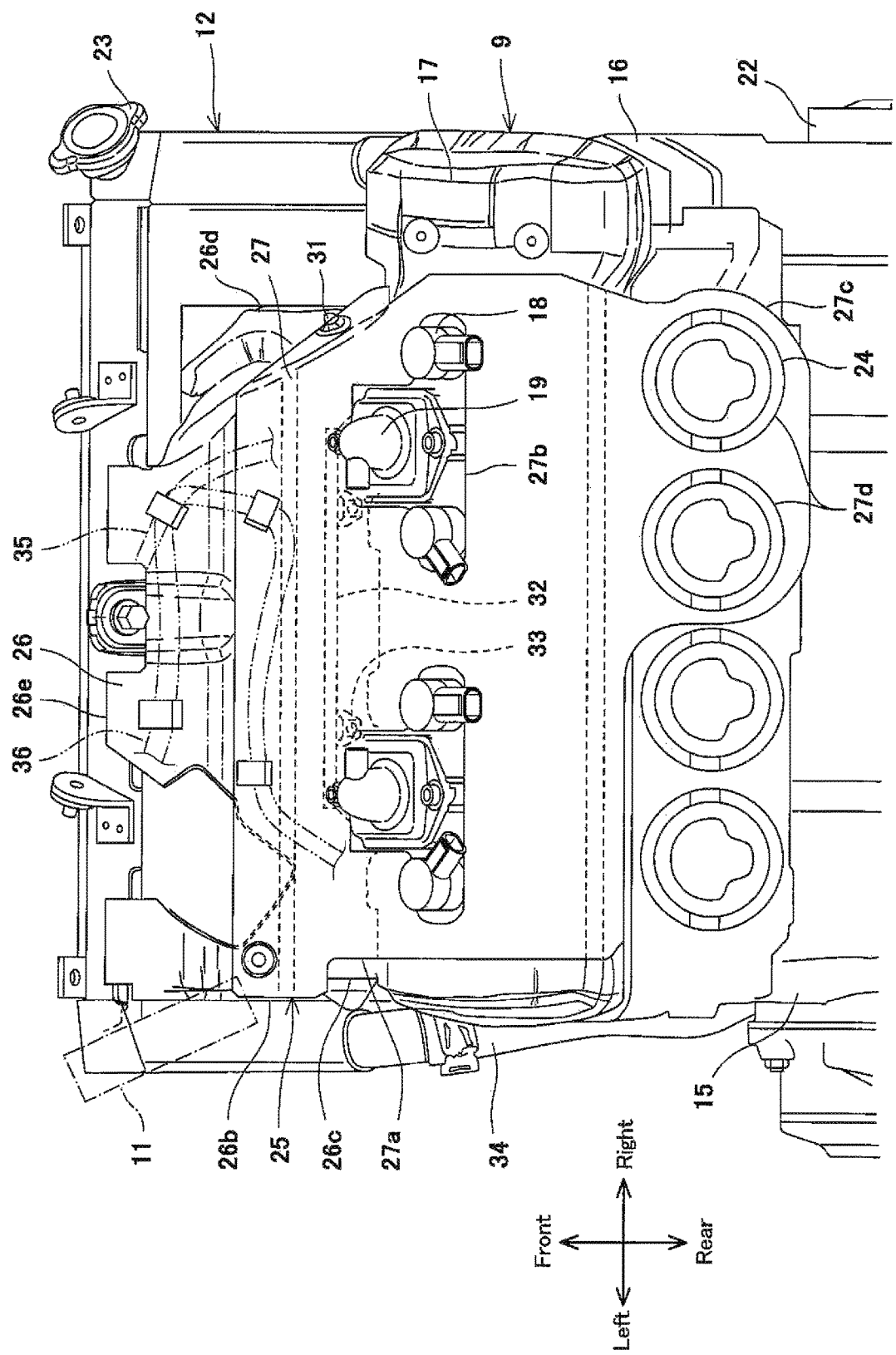
FIG. 6 is a top view of the engine, the radiator, and the cover unit of FIG. 2.

FIG. 6 is a top (plan) view of the engine 9, the radiator 12, and the cover unit 25 of FIG. 2. In the example of FIG. 6, the contour of the regulator 11 is indicated by dot-and-dash line. As shown in FIG. 6, the regulator 11 is positioned above the cover unit 25 and is spaced apart from the cover unit 25. When viewed from above (in a plan or top view), the regulator 11 is disposed at a location that overlaps with the hard cover 26.

The right portion of the front portion of the soft cover 27 is tilted in the downward direction, from the center in the vehicle width direction to the right side, and covers the outer surface of the guide side wall 26d of the hard cover 26. The left portion of the front portion of the soft cover 27 covers a portion of the rear portion of the hollow space 26g of the hard cover 26.

When viewed from above, a dimension in the vehicle width direction of the hard cover 26 is smaller than that of the radiator 12. The hard cover 26 is disposed inward relative to the both sides (right and left sides) of the radiator 12 in the vehicle width direction. When viewed from above, a dimension in the vehicle width direction of the soft cover 27 is smaller than that of each of the cylinder head 16 and the head cover 17. The soft cover 27 is disposed inward relative to the right and left sides of the head cover 17. In a space inside the vehicle body, the upper surface of the hard cover 26 and the upper surface of the soft cover 27 are covered by the fuel tank 10. In this configuration, the hard cover 26 and the soft cover 27 are not easily seen from the outside region of the motorcycle 1 although the motorcycle 1 is of the naked type.

The wire 35 and the harness 36 which are disposed inside the vehicle body are secured to the plurality of retaining members 28. Since the wire 35 and the harness 36 are positioned on the upper surface of the hard cover 26 by the retaining members 28, it becomes possible to prevent the heated air in the space 30 from contacting the wire 35 and the harness 36. The wire 35 and the harness 36 may be secured to the plurality of retaining members 28, respectively, or a common retaining member 28.

As described above, the hard cover 26 extending rearward from the radiator 12 and covering the space 30 is located at the front side of the cover unit 25. The hard cover 26 formed in the three-dimensional shape can properly guide the heated air from the front toward the rear. This makes it possible to suppress reduction of the heated air shield effects provided by the cover unit 25. The motorcycle 1 can be designed more flexibly.

Since the soft cover 27 extending rearward from the hard cover 26 and covering the engine 9 is located at a rear side of the cover unit 25, the soft cover 27 can be efficiently disposed in a case where the cover unit 25 is disposed in the space inside the vehicle body. Thus, the efficiency with which the operator disposes the cover unit 25 is not reduced. In this way, the motorcycle 1 can be more easily assembled by the operator. As a result, it becomes possible to realize an easier assembling operation and a more flexible design of the motorcycle 1.

In a motorcycle of a naked type, since a heat shield cover for preventing the heated air from contacting the body of the rider straddling the motorcycle and components of the motorcycle is not covered by a cowling, it is difficult to provide the heat shield cover in the motorcycle of the naked type while maintaining the appearance of the motorcycle, compared to a motorcycle with a cowling. In contrast, in the motorcycle 1 of the present embodiment, the cover unit 25 serves to prevent the heated air from contacting the body of the rider straddling the motorcycle 1 and components of the motorcycle 1. The soft cover 27 is located at the rear side of the cover unit 25 and is less noticeable, although the cowling does not cover the cover unit 25. In this way, the external appearance of the motorcycle 1 can be easily maintained.

The plurality of engagement portions 26e of the hard cover 26 are engaged with the upper end portion of the radiator 12, and thereby the front portion of the hard cover 26 is connected to the radiator 12. In this way, the front portion of the hard cover 26 can be connected to the radiator 12 with high assembling efficiency.

The rear wall 26c of the hard cover 26 is connected to the bracket 32 by the fastening members 33 and the grommets, and thereby the rear portion of the hard cover 26 is connected to the head cover 17. Therefore, disengagement of the hard cover 26 from the vehicle body of the motorcycle 1 can be prevented.

In a case where the engine 9 and the radiator 12 are mounted on the vehicle body frame 2, after the engine 9 is assembled, the hard cover 26 is fixed to the engine 9 in advance. In this way, the motorcycle 1 can be more easily assembled.

Since the side wall 26b of the hard cover 26 can increase the strength of the hard cover 26 and make it difficult for the hard cover 26 to be deformed, the heated air shield effects provided by the cover unit 25 can be stabilized. In addition, since the heated air can be guided in the downward direction along the wall surface of the side wall 26b, upward movement of the heated air can be effectively prevented.

Since the side wall 26b of the hard cover 26 is provided on the side where the fan 13 rotates in the downward direction in the front view, of the both sides (right and left sides) of the hard cover 26 in the vehicle width direction, the heated air can be efficiently guided in the downward direction along the side wall 26b, and the upward movement of the heated air can be effectively prevented.

Since the lower end portion of at least a portion of the side wall 26b of the hard cover 26 is located above the rotary shaft 13a of the fan 13, the heated air can be forcefully discharged from the lower end portion of the side wall 26b to an outward region in the vehicle width direction, along a tangential direction of the fan 13 in the front view. In this way, the heated air can be quickly moved away from the vehicle body of the motorcycle 1 while preventing the heated air from contacting the body of the rider straddling the motorcycle 1 and components of the motorcycle 1.

Since the lower end portion of the rear wall 26c of the hard cover 26 is located above the center of the radiator 12 in the vertical direction, the air which has flowed through the fan 13 can be guided in the rearward direction by the body 26a of the hard cover 26 extending rearward from the radiator 12, and guided in the downward direction by the rear wall 26c extending in the vertical direction from the body 26a of the hard cover 26. In this way, the upward movement of the heated air from the space 30 can be effectively prevented.

Since the lower end portion of the rear wall 26c of the hard cover 26 is located above the center of the radiator 12 in the vertical direction, a large amount of air can be flowed through the inside of the radiator 12 at a location that is below the lower end portion of the rear wall 26c and exchanges heat with the coolant flowing through the inside of the radiator 12. In this way, efficient heat exchange between the air and the coolant occurs.

Since the air which has flowed through the fan 13 can be efficiently guided by the guide side wall 26d, along the circumferential direction of the fan 13, the upward movement of the heated air from the fan 13 can be prevented by the cover unit 25, and hence the heated air shield effects provided by the cover unit 25 can be improved.

Since the radiator 12 includes the inlet 12a disposed on the right side in the vehicle width direction and the center of the hard cover 26 in the vehicle width direction is located on the left side in the vehicle width direction relative to the center of the radiator 12 in the vehicle width direction, in the front view, the air can be easily flowed through the inside of the radiator 12 on the right side in the vehicle width direction. Thus, the coolant in a high-temperature state which has flowed through the engine 9 and has just entered the radiator 12 through the inlet 12a can efficiently exchange heat with the air flowing through the inside of the radiator 12 and can be effectively cooled.

Since the hard cover 26 is provided with the plurality retaining members 28 used to secure the wire 35, the harness 36, and the tube connecting the radiator 12 to the reservoir tank 29, to the hard cover 26, the wire 35, the harness 36, and the tube can be easily positioned in the space inside the vehicle body, and the hard cover 26 also functions as a support member for supporting the plurality retaining members 28. Therefore, a support member which is separate from the cover unit 25 may be omitted.

When viewed from above (in a plan or top view), the regulator 11 which is a heat generation component generating heat during the control for the voltage value is disposed at a location that overlaps with the hard cover 26, the hard cover 26 can prevent the heated air moving upward from the space 30 from contacting the regulator 11. As a result, the regulator 11 can be stably operated.

The soft cover 27 covers the head cover 17 and is engaged with a portion of the engine 9 which is rearward of the head cover 17. In this configuration, the soft cover 27 can prevent the heated air generated by heating the air by the head cover 17 from moving in the upward direction, and upward displacement of the soft cover 27 from the head cover 17 due to the air does not occur.

At least one of the electric component 18 and the engine component 19 which protrude upward from the engine 9 is inserted into each of the front openings 27b of the soft cover 27 and the soft cover 27 is connected to the rear portion or upper portion of the hard cover 26. In this configuration, the soft cover 27 can be retained by the hard cover 26 and the engine 9 can be easily covered by the soft cover 27. Further, the electric component 18 or the engine component 19 can be easily operated through the front opening 27b in a state in which the soft cover 27 is mounted on the vehicle body of the motorcycle 1. Thus, the operator can easily perform maintenance.

Since the rear portion of the soft cover 27 is retained by the plurality of ducts 24 of the engine 9, the soft cover 27 fully covers from above the cylinder and the cylinder head 16 which are main heat generation sources of the engine 9. Therefore, it becomes possible to effectively prevent the heated air from contacting the body of the rider straddling the motorcycle 1.

When viewed from above, the dimension in the vehicle width direction of the soft cover 27 is set smaller than that of the cylinder head 16 of the engine 9. In this configuration, when viewed from the side (in a side view), the soft cover 27 is not easily seen from the outside region of the motorcycle 1. Therefore, the external appearance of the motorcycle 1 can be maintained.

Since the soft cover 27 is disposed inward relative to the both sides of the radiator 12 in the vehicle width direction, and the dimension in the vehicle width direction of the soft cover 27 is set smaller than the dimension in the vehicle width direction of the cylinder head 16 of the engine 9, when viewed from above, the soft cover 27 is not easily seen from the outside region of the motorcycle 1.

The hard cover 26 includes the plurality of engagement portions 26e which are arranged side by side in the vehicle width direction and have tip end portions extending downward, and each of the plurality of engagement portions 26e extends forward and is engaged with the upper end portion of the radiator 12. In accordance with this configuration, the hard cover 26 can be connected to the upper end portion of the radiator 12 with a high assembling efficiency by use of the plurality of engagement portions 26e.

The present invention is not limited to the above-described embodiment. The above-described configurations may be changed, added to or deleted from, within a scope of the spirit of the preset invention. The vehicle is not limited to the motorcycle and may be other vehicles such as a three-wheeled vehicle, personal watercraft (PWC), a snow mobile, and an all terrain vehicle (ATV). In a case where the straddle-type vehicle is the motorcycle, the motorcycle is not limited to the motorcycle of the naked type and may include the cowling.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

The invention claimed is:

1. A straddle vehicle comprising:
   a radiator through which air flowing from a front flows in a forward and rearward direction of a vehicle body;
   an engine which generates driving power for allowing the straddle vehicle to travel, the engine being disposed rearward of the radiator; and
   a cover unit covering from above a space formed between the radiator and the engine, and the engine,
   wherein the cover unit includes:
   a hard cover which is located at a front side of the cover unit, extends rearward from the radiator, and covers the space formed between the radiator and the engine; and
   a soft cover which is located at a rear side of the cover unit, extends rearward from the hard cover, and covers the engine.

2. The straddle vehicle according to claim 1, further comprising:
   a fan which is disposed in such a manner that an axial direction of a rotary shaft of the fan conforms to the forward and rearward direction, and forcibly flows the air through the radiator,
   wherein the hard cover includes a side wall extending in a vertical direction, on at least a first side in a vehicle width direction of the vehicle body.

3. The straddle vehicle according to claim 2,
   wherein the first side in the vehicle width direction is a side where the fan is rotatable in a downward direction in a front view, of both sides in the vehicle width direction, and
   wherein a lower end portion of at least a portion of the side wall of the hard cover is located above the rotary shaft of the fan.

4. The straddle vehicle according to claim 2,
   wherein the hard cover further includes a body extending rearward from the radiator, and a rear wall extending in the vehicle width direction and in the vertical direction, from the body, and
   wherein a lower end portion of the rear wall of the hard cover is located above a center of the radiator in the vertical direction.

5. The straddle vehicle according to claim 2,
   wherein the hard cover further includes a guide side wall which is located on a second side in the vehicle width direction, is curved along a circumferential direction of the fan, and guides the air along the circumferential direction of the fan, in a front view.

6. The straddle vehicle according to claim 1,
   wherein the radiator includes an inlet which is disposed on a third side in a direction perpendicular to the forward and rearward direction and through which a coolant which has cooled the engine flows into the radiator, and
   wherein in a front view, a center of the hard cover in the direction perpendicular to the forward and rearward direction is located on a fourth side in the direction perpendicular to the forward and rearward direction, relative to a center of the radiator in the direction perpendicular to the forward and rearward direction.

7. The straddle vehicle according to claim 1, further comprising:
   a retaining member which is provided at the hard cover and secures a harness disposed inside the vehicle body to the hard cover.

8. The straddle vehicle according to claim 1, further comprising:
   a regulator which controls a voltage value of electric power output from a power generator which generates electric power by the driving power generated by the engine,
   wherein when viewed from above, the regulator is disposed at a location that overlaps with the hard cover.

9. The straddle vehicle according to claim 1,
   wherein the soft cover covers a head cover of the engine, and is engaged with a portion of the engine which is rearward of the head cover.

10. The straddle vehicle according to claim 1,
    wherein at least one of an electric component of the engine and an engine component included in the engine is provided at the engine and protrudes upward from the engine, and at least one air-intake system member is connected to the engine,
    wherein the soft cover includes an opening into which at least one of the electric component and the engine component is inserted, and is connected to a rear portion or an upper portion of the hard cover, and
    wherein a rear portion of the soft cover is retained by a connection section of the engine which is connected to the at least one air-intake system member.

11. The straddle vehicle according to claim 1,
    wherein when viewed from above, a dimension in a vehicle width direction of the soft cover is set smaller than a dimension in the vehicle width direction of a cylinder head of the engine.

12. The straddle vehicle according to claim 1,
wherein the soft cover is disposed inward relative to both sides of the radiator in a vehicle width direction, and
wherein when viewed from above, a dimension in the vehicle width direction of the soft cover is set smaller than a dimension in the vehicle width direction of a cylinder head of the engine.

13. The straddle vehicle according to claim 1,
wherein the hard cover includes a plurality of engagement portions which are arranged side by side in a vehicle width direction and have tip end portions extending downward, and
wherein each of the plurality of engagement portions extends forward and is engaged with an upper end portion of the radiator.

* * * * *